(12) United States Patent
Bates et al.

(10) Patent No.: US 7,941,482 B2
(45) Date of Patent: May 10, 2011

(54) SYSTEM AND METHOD FOR MANAGING PERFORMANCE BETWEEN MULTIPLE PEERS IN A PEER-TO-PEER ENVIRONMENT

(75) Inventors: John P. Bates, Foster City, CA (US); Howard Berkey, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1539 days.

(21) Appl. No.: 10/832,797

(22) Filed: Apr. 26, 2004

(65) Prior Publication Data

US 2004/0260799 A1    Dec. 23, 2004

Related U.S. Application Data

(60) Provisional application No. 60/476,084, filed on Jun. 4, 2003.

(51) Int. Cl.
*G06F 15/16* (2006.01)
(52) U.S. Cl. .................. 709/203; 709/201; 709/202
(58) Field of Classification Search .................. 709/203
See application file for complete search history.

(56) References Cited

U.S. PATENT DOCUMENTS 6,307,558 B1 * 10/2001 Mao .............................. 345/428

2002/0156893 A1 * 10/2002 Pouyoul et al. ............... 709/225
2003/0074402 A1      4/2003 Stringer-Calvert et al.

OTHER PUBLICATIONS

Anirban Mondal, Kazuo Goda, Masaru Kitsuregawa, "Effective load-balancing of peer-to-peer systems," 14th Data Engineering Workshop, retrieved from the Internet: Http://www.tkl.iis.u-tokyo.ac.jp/kilab/Research/Paper/2003/anirban/dew.pdf>.*
International Search Report.
Anirban Mondal, Kazuo Goda, Masaru Kitsuregawa, "Effective load-balancing of peer-to-peer systems," 14$^{th}$ Data Engineering Workshop, retrieved from the Internet: http://www.tkl.iis.u-tokyo.ac.jp/Kilab/Research/Paper/2003/anirban/dew.pdf>.

* cited by examiner

*Primary Examiner* — John Follansbee
*Assistant Examiner* — Maceeh Anwari
(74) *Attorney, Agent, or Firm* — Martine Penilla & Gencarella, LLP (57) ABSTRACT

A method of dynamically balancing a load on a fully connected grid (FCG) in a peer-to-peer environment includes determining if a first number of peers connected in a first FCG is greater than a preselected limit. If the first number of peers connected to the first FCG is greater than the preselected limit, then partitioning the first FCG into two or more subdivided FCGs, wherein each of the subdivided FCGs includes at least one peer connection that was previously connected in the first FCG. A subdivided location identifier can also be published for each respective resource included in each peer connection. A system for dynamically balancing a load on a fully connected grid (FCG) in a peer-to-peer environment is also described.

49 Claims, 7 Drawing Sheets

SYSTEM AND METHOD FOR MANAGING PERFORMANCE BETWEEN MULTIPLE PEERS IN A PEER-TO-PEER ENVIRONMENT

CROSS REFERENCE TO RELATED APPLICATIONS

This application claims priority from U.S. Provisional Patent Application No. 60/476,084 filed on Jun. 4, 2003 and entitled "Virtual/Real World Dynamic Intercommunication Methods and Systems," which is incorporated herein by reference in its entirety.

BACKGROUND OF THE INVENTION

1. Field of the Invention

The present invention relates generally to managing performance in a network, and more particularly, to systems and methods for managing real-time performance between a bounded number of peers in a peer-to-peer environment that includes an unbounded number of peers.

2. Description of the Related Art

Many prior art approaches have been used to allow large peer-to-peer groups to communicate. A highly scalable, distributed hash-table overlay is typically used to provide logical links between members of the peer-to-peer group. By way of example, a commonly used highly scalable, distributed hash-table overlay is known as Chord such as described in "Chord: A Scalable Peer-to-Peer Lookup Service for Internet Applications," by Stoica et al, (August 2001), In the Proceedings of AGM SIGCOMM 2001, San Diego, Calif. and also published at: http://pdos.lcs.mit.edu/chord/. The typical highly scalable, distributed hash-table overlay provides the ability to have a large peer-to-peer group that has a substantially unlimited number of peers (e.g., an unbounded peer group). The overlay also provides a look-up capability to look up hashed objects (i.e., resources) and identify which peer is publishing a particular the hashed object.

Peer-to-peer systems and applications are distributed systems without any centralized control or hierarchical organization (i.e., not client-server-based systems). The software required to participate in the per-to-peer environment that is running on each peer is substantially equivalent in functionality. The features of typical peer-to-peer systems include redundant storage, permanence, and selection of nearby servers, anonymity, search, authentication and hierarchical naming. The core functionality in most peer-to-peer systems is the efficient location of data items (i.e., objects). Typical per-to-peer overlay systems support one primary function: that of mapping a key to a respective peer.

Figure 1A:
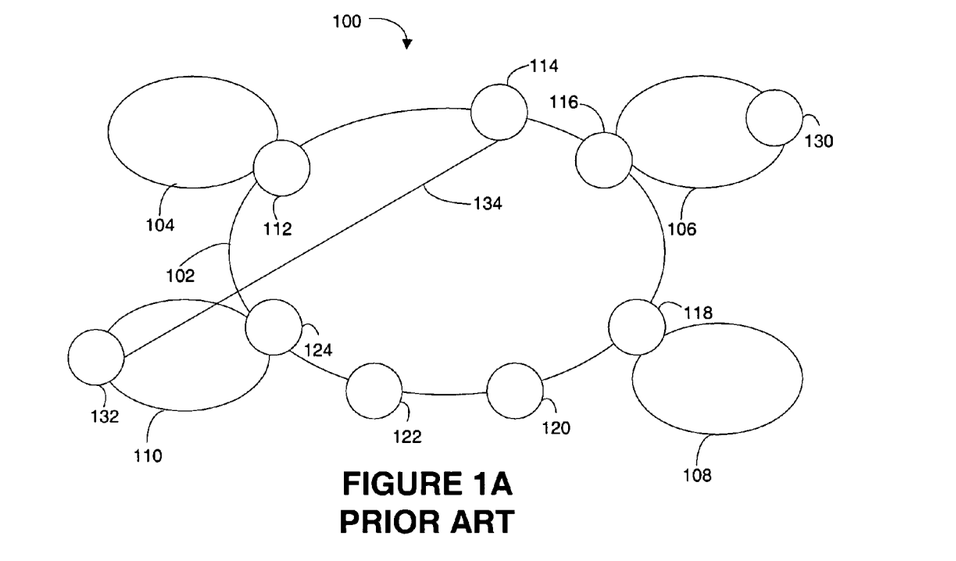
FIG. 1A shows a typical peer-to-peer system.

FIG. 1A shows a typical peer-to-peer system 100. The peer-to-peer system 100 includes several nodes 112-124 in a first grid 102. Nodes 112-124 are peers because they are coupled together via grid 102. Nodes 112, 116, 118, 124 are also members of respective neighboring grids 104, 106, 108, 110. In operation, each of the peers 112-124 publish their presence (e.g., the availability of their respective resources) to each of the other peers on the grid 102 via the communication channels provided by the grid. The grid 102 is typically referred to as a universal grid (i.e., UG). While the grid 102 is shown as a two-dimensional grid for ease of illustration and discussion, it should be understood that the term "grid" could include more than two dimensions.

Nodes 130 and 132 are not directly connected to the UG 102 and therefore are not peers to all of the nodes 112-124. Nodes 130 and 132 are indirectly connected to UG 102, through respective peers 116 and 124. The presence of each of the peers 112-124 can also be published to nodes 130 and 132 through respective peers 116 and 124. In this manner, node 132 can discover and find the resources of peer 114. Node 132 can also form a direct link 134 to peer 114 to provide a more direct access to the resources of peer 114. The direct link 134 allows the both peers 114 and 132 to directly access the resources of one or both of the peers 114 and 132. The direct link 134 can also be thought of as a separate grid containing just two peers 114 and 132. Once the direct link 134 is formed, then one or both of the peers 114 and 132 can disconnect from their respective grids 102 and 110.

Figure 1B:
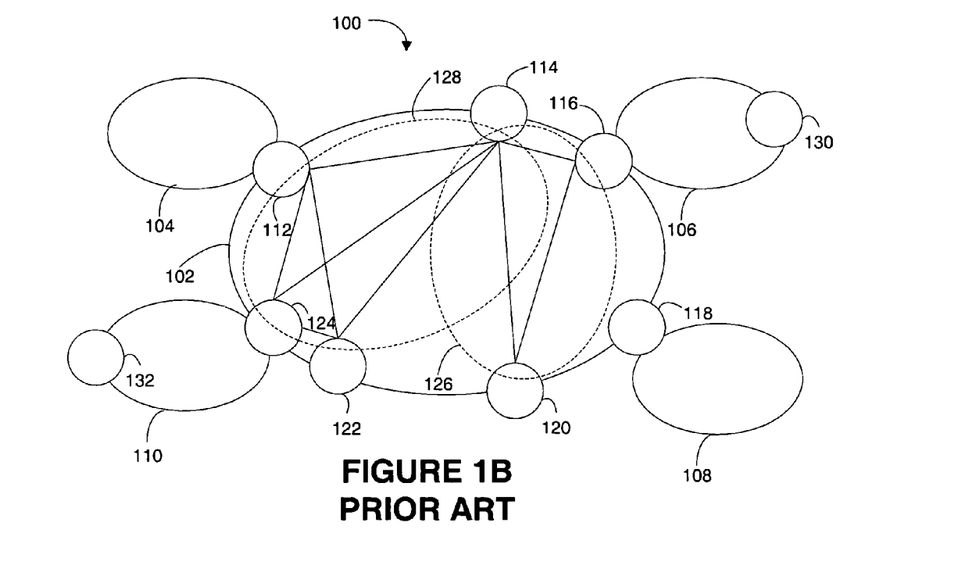
FIG. 1B shows the UG and two fully connected grids (FCGs).

FIG. 1B shows the UG 102 and two fully connected grids (FCG) 126 and 128. In an FCG, direct links are formed between each of the peers in the FCG and each other peer in the FCG. The links between each of the peers in the FCG are shown as lines connecting the peers together. By way of example, in FCG 126, links are established from each peer 114, 116, 120 to each other peer in the FCG 126. Similarly, in FCG 128, links are established from each peer 114, 112, 122, 124 to each other peer in the FCG 128. Each peer member of an FCG receives a notification of all the resources available in all of the peers in the FCG. The notification is received in all of the peers in the FCG when the peers join the FCG.

Figure 1C:
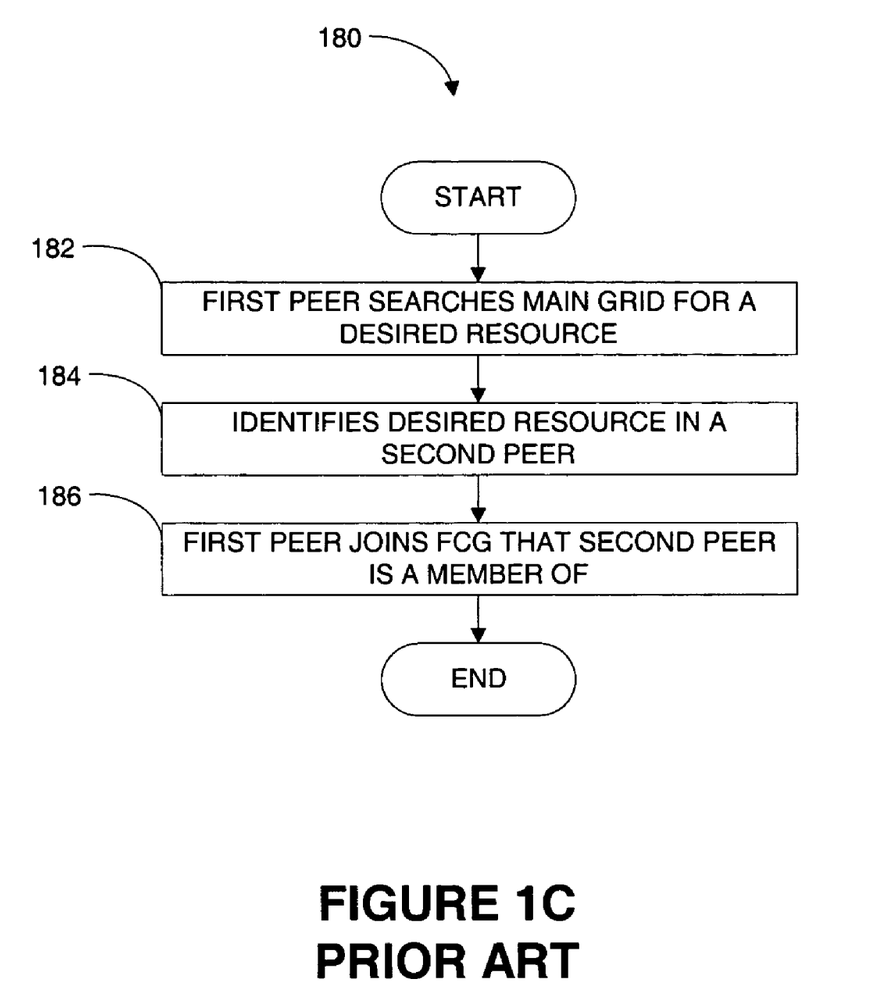
FIG. 1C is a flow chart of the method operations of locating a peer on the grid.

FIG. 1C is a flow chart of the method operations 180 of locating a peer on the grid 102. With reference to FIGS. 1A-1C, in an operation 182, a first peer (e.g., peer 122) can join the UG 102 to search for and locate resources that may be provided by one of the other peers 112, 114, 116, 118, 120 and 124 that are already connected to the UG 102. In an operation 184, a desired resource is identified in a second peer (e.g., peer 114). In an operation 186, the first peer 122 joins the FCG 128 that includes the second peer 114. When peer 122 joins the FCG 128, the peer 122 forms direct links to each of the peers 114, 124 and 112 in the FCG 128. The method operations can then end.

Over time, more and more peers will connect in an FCG that has a particular object of interest. Unfortunately, as the number of peers in an FCG increases the number of direct links to each peer also increases. Recall also that each peer can be connected to multiple grids, even an infinite number of grids. As a result, the peers can often become overloaded. The operational overhead required by having too many direct links decreases the amount of processing time available to provide the desired access in a timely manner. As a result as the number of connections in an FGC increases, the ability of each peer member of the FCG to provide the direct access in an efficient and in a timely manner decreases. In view of the foregoing, there is a need for a system and method of managing the number of direct connections to each peer in an FCG.

SUMMARY OF THE INVENTION

Broadly speaking, the present invention fills these needs by providing an improved system and method of balancing loads on fully connected grids in a peer-to-peer environment. It should be appreciated that the present invention can be implemented in numerous ways, including as a process, an apparatus, a system, computer readable media, or a device. Several inventive embodiments of the present invention are described below.

One embodiment provides a method of dynamically balancing a load on a fully connected grid (FCG) in a peer-to-peer environment includes determining if a first number of peers connected in a first FCG is greater than a preselected limit. If the first number of peers connected to the first FCG is greater than the preselected limit, then partitioning the first FCG into two or more subdivided FCGs, wherein each of the subdivided FCGs includes at least one peer connection that was previously connected in the first FCG. A subdivided location identifier can also be published for each respective resource included in each peer connection.

The subdivided location identifiers are related to a location identifier for the first FCG. Partitioning the first FCG into the subdivided FCGs can include partitioning the first FCG into octrees. Partitioning the first FCG into two or more new FCGs can also include partitioning the first FCG into two or more stacked FCGs.

The method can also include determining if a total number of peers connected to the subdivided FCGs is less than the preselected limit. If the total number of peers connected to the subdivided FCGs is less than the preselected limit, the subdivided FCGs can be collapsed into the first FCG. A location identifier for each respective resource included in each peers connection to the first FCG can also be published.

At least a portion of the peer-to-peer environment can be connected to the Internet. At least a portion of the peer-to-peer environment can enable an interactive gaming application. A game console can include at least one peer.

Another embodiment provides a system for managing load in a peer-to-peer environment. The system including multiple peers connected in a fully connected grid (FCG) in the peer-to-peer environment and logic for determining if a first number of peers connected to a first FCG is greater than a preselected limit and logic for partitioning the first FCG into subdivided FCGs, if the first number of peers connected to the first FCG is greater than the preselected limit. Each of the subdivided FCGs includes at least one peer connection that was previously connected in the first FCG.

At least one of the peers can include the logic for determining if a first number of peers connected to a first FCG is greater than a preselected limit and the logic for partitioning the first FCG into subdivided FCGs, if the first number of peers connected to the first FCG is greater than the preselected limit.

The system can also include logic for publishing a subdivided location identifier for each respective resource included in each peer connection. The subdivided location identifiers are related to a location identifier for the first FCG.

The logic for partitioning the first FCG into the subdivided FCGs can include logic for partitioning the first FCG into octrees. The logic for partitioning the first FCG into the subdivided FCGs can include logic for partitioning the first FCG into two or more stacked FCGs.

The system can also include logic for determining if a total number of peers connected to the subdivided FCGs is less than a preselected limit and logic for collapsing the subdivided FCGs into the first FCG, if the total number of peers connected to the subdivided FCGs is less than the preselected limit. The system can also include logic for publishing a location identifier for each respective resource included in each peers connection to the first FCG.

At least a portion of the peer-to-peer environment can enable an interactive gaming application. A game console can include at least one peer in the peer-to-peer environment.

Another embodiment provides a system including a computing device. The computing device is one of multiple peers connected to a fully connected grid (FCG) in peer-to-peer environment, the computing device includes logic for communicating with at least another one of the peers, logic for determining if a first number of peers connected to a first FCG is greater than a preselected limit and logic for coordinating subdivision of the first FCG into a subdivided FCGs with the at least another one of the peers, if the first number of peers connected to the first FCG is greater than the preselected limit.

Each of the subdivided FCGs can include at least one peer connection that was previously connected to the first FCG. The system can also include logic for publishing a subdivided location identifier for each respective resource included in each peer connection. The computing device can be a game console.

The system can also include logic for determining if a total number of peers connected to the subdivided FCGs is less than the preselected limit and logic for coordinating collapsing the subdivided FCGs into the first FCG, if the total number of peers connected to the subdivided FCGs is less than the preselected limit.

Another embodiment provides a system that includes a fully connected grid (FCG) in a peer-to-peer environment and multiple computing devices connected to the FCG. A computer readable code segment embodied in a computer readable medium for determining if a first number of peers connected to a first FCG is greater than a preselected limit is also included. A computer readable code segment embodied in a computer readable medium for partitioning the first FCG into two or more subdivided FCGs, if the first number of peers connected to the first FCG is greater than the preselected limit is also included. Each of the subdivided FCGs includes at least one peer connection that was previously connected to the first FCG.

At least one of the peers can include the computer readable code segment embodied in a computer readable medium for determining if a first number of peers connected to a first FCG is greater than a preselected limit and the computer readable code segment embodied in a computer readable medium for partitioning the first FCG into two or more subdivided FCGs, if the first number of peers connected to the first FCG is greater than the preselected limit.

The computing device can include a game console. The system can also include a second game console that includes at least one peer in the peer-to-peer environment.

The system can also include a computer readable code segment embodied in a computer readable medium for determining if a total number of peers connected to the subdivided FCGs is less than the preselected limit and a computer readable code segment embodied in a computer readable medium for collapsing the subdivided FCGs into the first FCG, if the total number of peers connected to the subdivided FCGs is less than the preselected limit.

The computer readable code segment embodied in a computer readable medium for partitioning the first FCG into two or more subdivided FCGs can include a computer readable code segment for partitioning the first FCG into octrees. The computer readable code segment embodied in a computer readable medium for partitioning the first FCG into two or more subdivided FCGs can include a computer readable code segment for partitioning the first FCG into two or more stacked FCGs.

At least a portion of the peer-to-peer environment can be connected to the Internet. At least a portion of the peer-to-peer environment can enable an interactive gaming application. The computer readable medium can include a propagated data signal.

Another embodiment provides a peer-to-peer network that includes a universal grid, at least two subdivided fully connected grids (FCGs) and multiple peers. Each subdivided FCGs having a location identifier related to a parent location identifier for a parent FCG. Each one of the multiple peers being a member of the universal grid. At least a portion of the peers being members of at least one of the two or more subdivided FCGs.

At least one of the peers can include the means for determining if the first number of peers connected to the parent FCG is greater than the preselected limit and the means for partitioning the parent FCG into the two or more subdivided FCGs, if the first number of peers connected to the parent FCG is greater than the preselected limit.

The at least two subdivided FCGs can be octrees of the parent FCG. The at least two subdivided FCGs can be stacked FCGs. The peer-to-peer network can be connected to the Internet. At least a portion of the peer-to-peer network can support an interactive gaming application. The peer-to-peer network can also include a game console that includes at least one peer in the peer-to-peer environment.

Yet another embodiment provides a peer-to-peer network that includes a universal grid, at least two subdivided fully connected grids (FCGs), and multiple peers. Each subdivided FCGs having a location identifier means related to a parent location identifier means for a parent FCG. Each one of the peers being a member of the universal grid, and at least a portion of the peers being members of at least one of the two or more subdivided FCGs. The peer-to-peer network further includes means for determining if a first number of peers connected to the parent FCG is greater than a preselected limit and means for partitioning the parent FCG into the two or more subdivided FCGs, if the first number of peers connected to the parent FCG is greater than the preselected limit.

The peer-to-peer network can further include means for publishing a subdivided location identifier for each respective resource included in each peer connection. The peer-to-peer network can further include means for determining if a total number of peers connected to the subdivided FCGs is less than a preselected limit and means for collapsing the subdivided FCGs into the parent FCG, if the total number of peers connected to the subdivided FCGs is less than the preselected limit.

Another embodiment provides a computer readable medium having a computer readable code segment for balancing a load on a fully connected grid (FCG) in a peer-to-peer environment. The computer readable medium includes a computer readable code segment for determining if a first number of peers connected in a first FCG is greater than a preselected limit and a computer readable code segment for partitioning the first FCG into two or more subdivided FCGs, if the first number of peers connected to the first FCG is greater than the preselected limit. Each of the subdivided FCGs includes at least one peer connection that was previously connected in the first FCG.

At least one of the peers in the peer-to-peer environment includes the computer readable code segment for determining if a first number of peers connected to a first FCG is greater than a preselected limit and the computer readable code segment for partitioning the first FCG into subdivided FCGs, if the first number of peers connected to the first FCG is greater than the preselected limit.

The computer readable medium can also include a computer readable code segment for publishing a subdivided location identifier for each respective resource included in each peer connection. The subdivided location identifiers can be related to a location identifier for the first FCG.

The computer readable medium can also include a computer readable code segment for determining if a total number of peers connected to the subdivided FCGs is less than the preselected limit and a computer readable code segment for collapsing the subdivided FCGs into the first FCG, if the total number of peers connected to the subdivided FCGs is less than the preselected limit. A computer readable code segment for publishing a location identifier for each respective resource included in each peer connection to the first FCG can also be included.

Another embodiment provides a method of dynamically balancing a load on a fully connected grid (FCG) in a peer-to-peer environment. The method includes determining if a first number of peers connected in a first FCG is less than a preselected limit and if the first number of peers connected to the first FCG is less than the preselected limit, then the first FCG is merged with a second FGC to form a merged FGC. The merged FGC includes a merged location identifier that is related to the first FCG and the second FGC.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION OF THE EXEMPLARY EMBODIMENTS

Several exemplary embodiments for systems and methods of managing the number of direct connections to each peer in an FCG will now be described. It will be apparent to those skilled in the art that the present invention may be practiced without some or all of the specific details set forth herein.

As described above, there are two types of grids that are formed in peer-to-peer networks. A universal grid (UG) is provided for each peer to publish their respective resources and for locating resources provided by other peers. A peer can also be a member of a fully connected grid (FCG). The FCG provides direct links between each of the peers in the FCG so that the peers can more directly access the resources provided by each of the peers.

Figure 2:
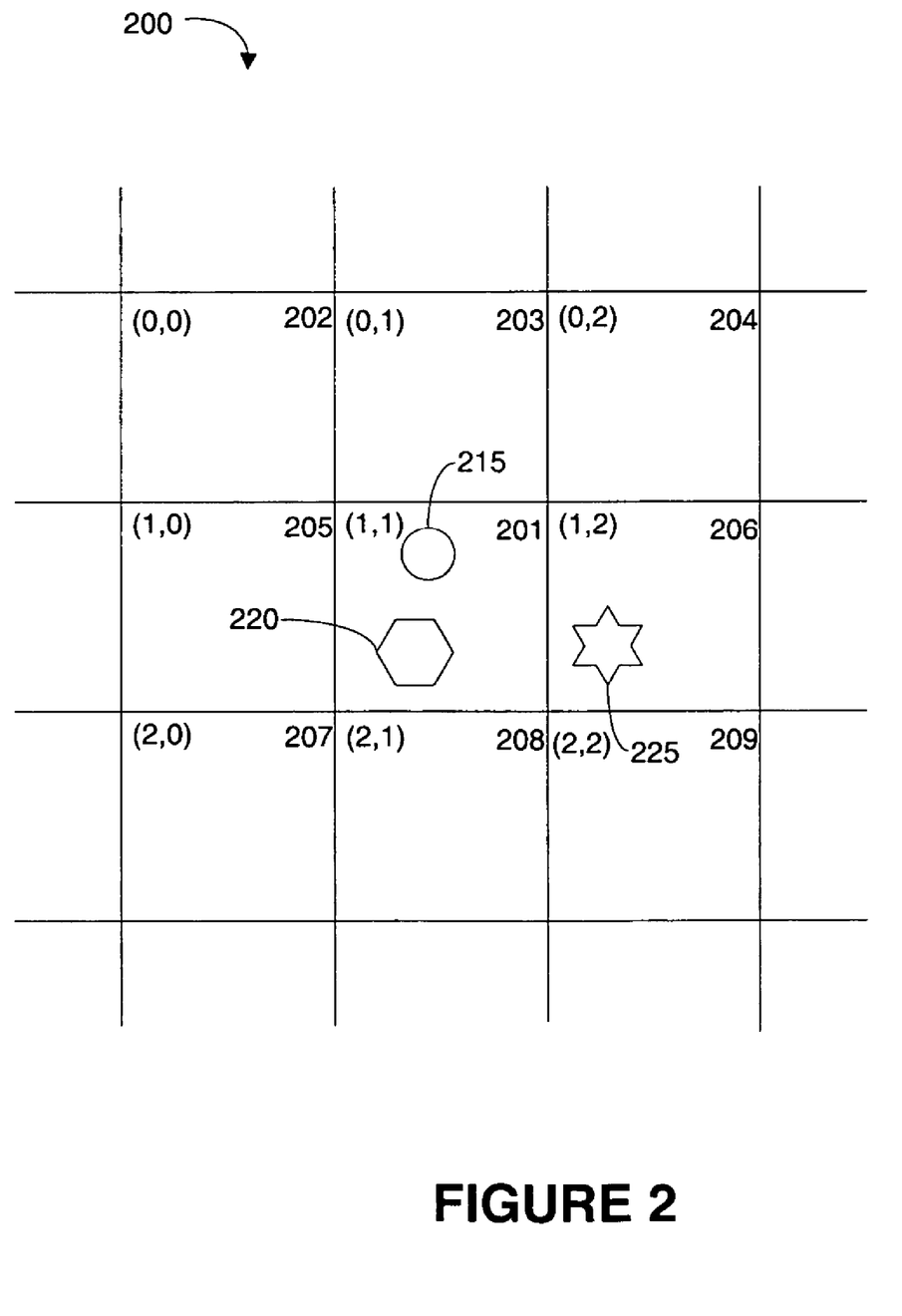
FIG. 2 shows a universal grid (UG), in accordance with one embodiment of the present invention.

FIG. 2 shows a universal grid (UG) 200, in accordance with one embodiment of the present invention. The UG 200 is shown as a finite portion of a virtually infinite 2-dimensional grid. It should be understood that the 2-dimensional grid can include many additional sectors (i.e., a virtually infinite number) that extend in all directions. It should also be understood that the 2-dimensional grid is merely an exemplary embodiment and that the present inventions as disclosed herein can be applied to any n-dimensional numerical space that can be meaningfully divided into finite sectors. Each of the sectors can be represented by an FGC that are located within the sector. The UG 200 includes many peers (not shown) that form multiple FCGs 201-209. Each of the FCGs 201-209 has a location identifier. By way of example FCG 201 has a location identifier of (1,1) and FCG 202 has a location identifier of (0,0). It should be understood that the location identifiers are presented in an exemplary form (i.e., a Cartesian-type coordinate format) only. Other forms of location identifiers (e.g., IP address formats, randomized numbers, or other addressing scheme) can also be used. The location identifiers allow a peer 215 to be located. By way of example, when the peer 215 joins the UG 200, the peer 215 publishes its location identifier along with the resources provided by peer 215. It should also be understood that the UG 200 is shown as a two-dimensional grid for ease of discussion and depiction only. The UG 200 can have three or more dimensions.

Data objects 220 and 225 are resources that may be accessed by one of the peers in the UG 200. Respective peers on the UG 200 provide the data objects 220 and 225. The data objects 220 and 225 are located in FCGs 201 and 206, respectively. In operation, when peer 215 joins the UG 200 it can search the UG for a desired resource (e.g. object 220). Peer 215 can join FCG 201 to provide a direct access to the object 220.

Figure 3:
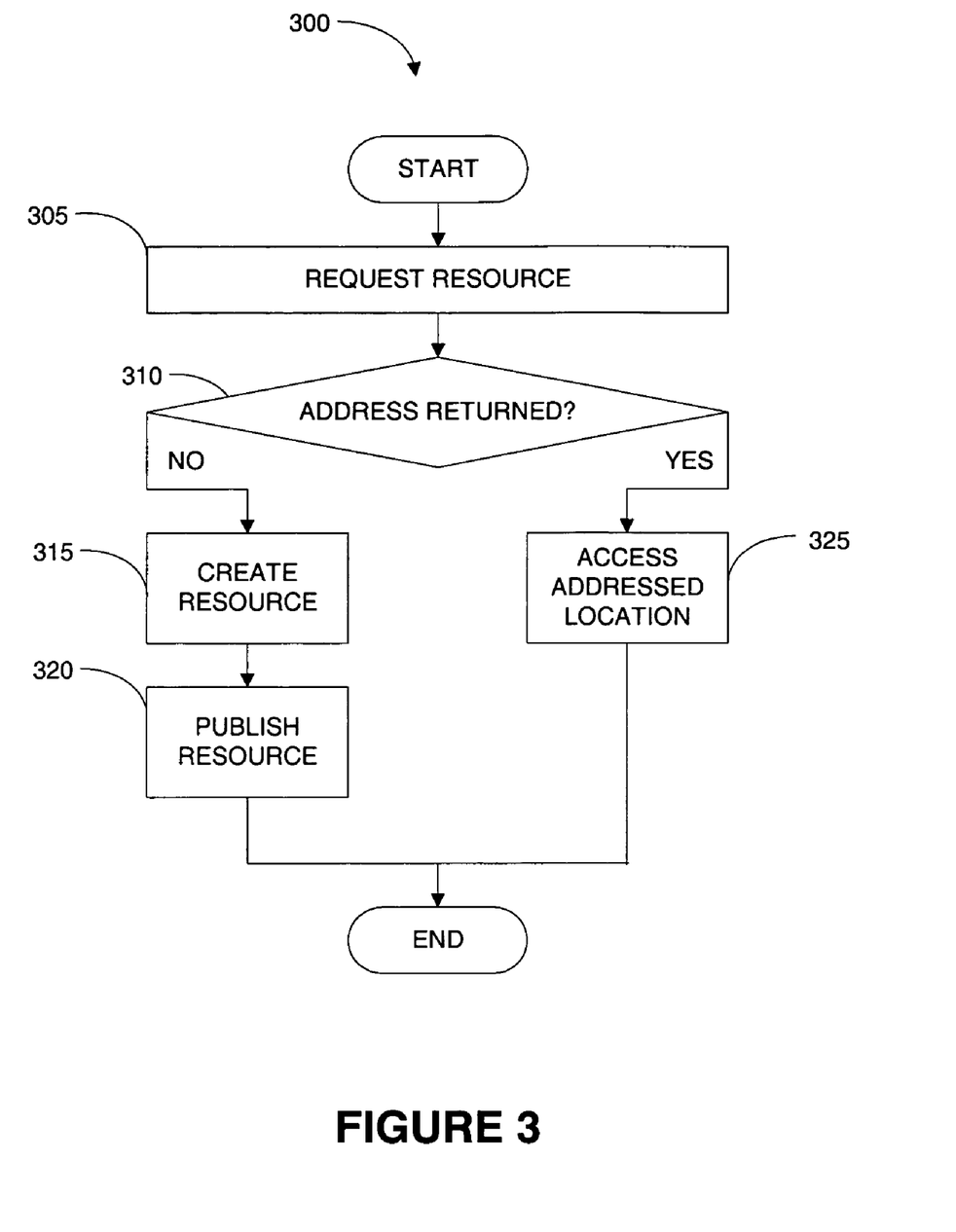
FIG. 3 is a flowchart of the method operations of a peer searching a UG, in accordance with one embodiment of the present invention.

FIG. 3 is a flowchart of the method operations 300 of a peer searching a UG, in accordance with one embodiment of the present invention. In an operation 305, the peer (e.g., peer 215 of FIG. 2 above) searches the UG 200 for a desired resource of interest that has been published on the UG. The search can be for example via query of a hash table or other means of querying the UG for a published address or other location identifying means for the resource of interest.

In an operation 310, if an address (e.g., a location identifier) is returned, then the method operations continue in operation 325. In operation 325, the peer 215 can access the desired resource by joining the FCG that is located at the location identifier that is returned and the method operations can end. By way of example, referring again to FIG. 2, when peer 215 joins the UG 200, the other peers in the UG will publish their respective resources and respective location identifiers to peer 215. Publishing the respective location identifiers can include storing the location identifier in a resource such as a hash table or other look-up reference table. The look-up reference table can be maintained by the publishing peer or each of the peers in the grid.

In this manner, peer 215 can become "aware" of the resources and locations of the resources that are available. If at a later time, peer 215 desires to access resource 220, peer 215 can send a query to the UG 200 and an address or location identifier of (1,1) is returned which represents the location of FCG 201. Peer 215 can then join FCG 201 to access the resource 220.

Referring again to FIG. 3, if in operation 310, an address or location identifier is not returned, the method operations can continue in operation 315. A location identifier may not be returned because a first peer that was a member of the UG 200 when peer 215 joined the UG, disconnected from the UG 200 at some later time. As a result a search for the resources that were published to peer 215 as being provided by the first peer are no longer available.

In an operation 315, the peer 215 can create the desired resource since the desired resource was not available. In an operation 320, the newly created resource can be published to the UG 200 and the method operations can end.

As described above, as more and more peers access the object 220 by joining FCG 201, the number of connections for each peer in FCG 201 also increases. Each peer can also be a member of multiple FCGs and UGs and possibly an infinite number of grids.

Figure 4:
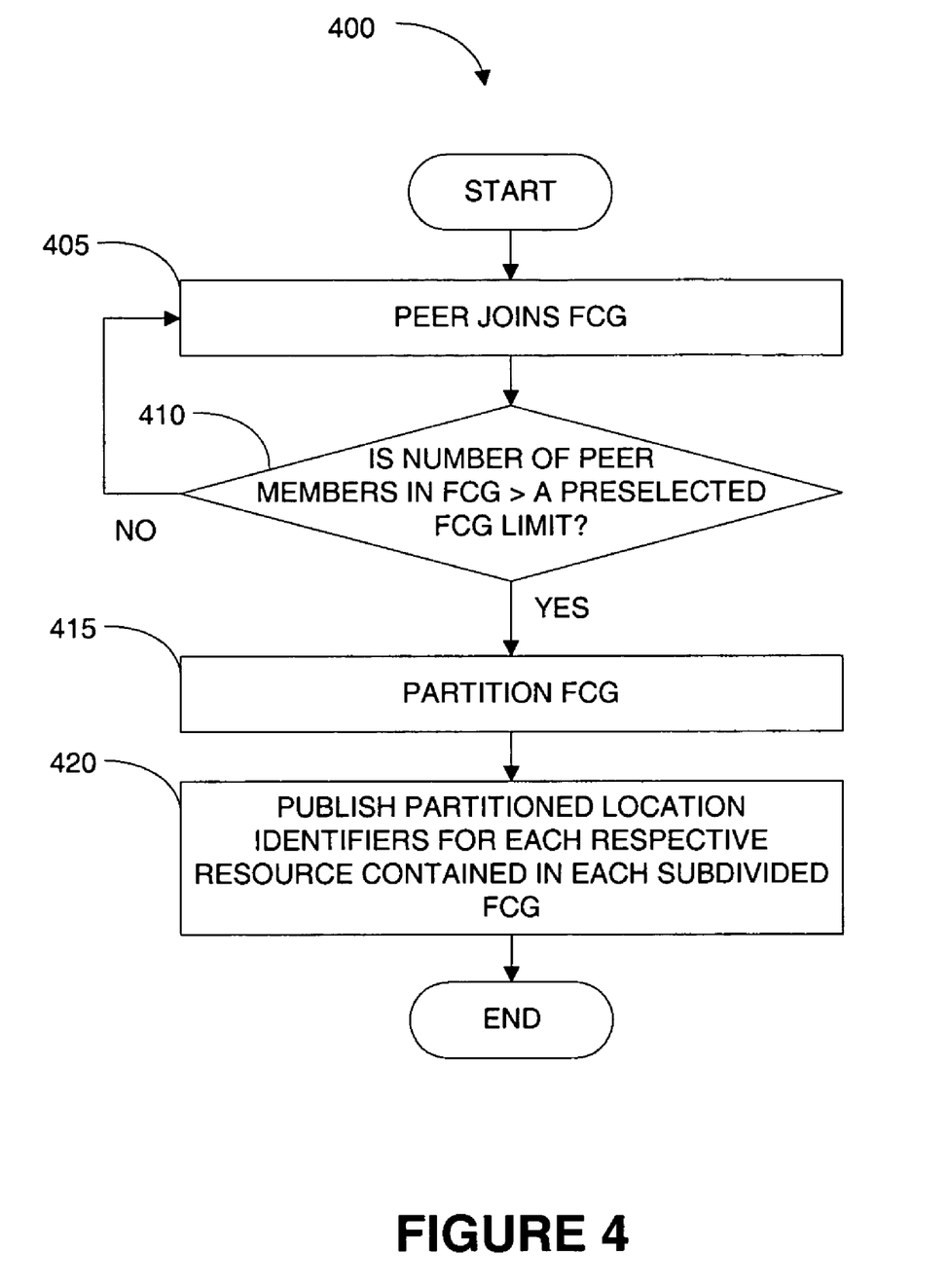
FIG. 4 is a flowchart of the method operations of balancing the load in an FCG, in accordance with an embodiment of the present invention.

FIG. 4 is a flowchart of the method operations 400 of balancing the load in an FCG, in accordance with an embodiment of the present invention. In an operation 405 a peer joins an FCG as described above. In an operation 410, the number of peers connected in the FCG is compared to a preselected FCG limit (e.g., by a comparing operation or a comparing means). If the number of peers connected in the FCG is less than or equal to the preselected FCG limit, then the method operations continue in operation 405 as described above.

The FCG limit can be an arbitrary limit that was manually preselected. The FCG limit can also be dynamically determined as a function of an application being supported by the peer-to-peer environment. By way of example, if a first application requires a relatively small processing bandwidth for each peer, then more peer connections in the FCG can be supported by the first application. Conversely, if a second application requires a larger processing bandwidth for each peer than the first application, then as compared to the first application, fewer peer connections in the FCG can be supported by the second application.

The FCG limit can also be a dynamic function of a time delay. By way of example, if a resource provided by a first peer in the FCG is accessed or requested by a second peer, but the first peer does not respond in less than a particular time delay, then the then current FCG limit can be reduced so as to cause the FCG to be partitioned as described below and thereby reduce the time delay for responding to the request for the resource.

If, in operation 410, the number of peers connected in the FCG is greater the preselected FCG limit, then the method operations continue in operation 415. In operation 415, the FCG is partitioned. The FCG can be partitioned into multiple subdivided FCGs as will be described in more detail below. Partitioning the FGC can include coordinating between the multiple peers that are members of the FGC to be partitioned.

In operation 420, the subdivided location identifiers for each respective resource contained in each subdivided FCG can be published such as by a publishing means. The subdivided location identifiers are published so that the peer members of the subdivided FCG will have the new (i.e., subdivided) location identifiers for each resource. The new location identifiers can be referred to as subdivided location identifiers.

Figure 5A:
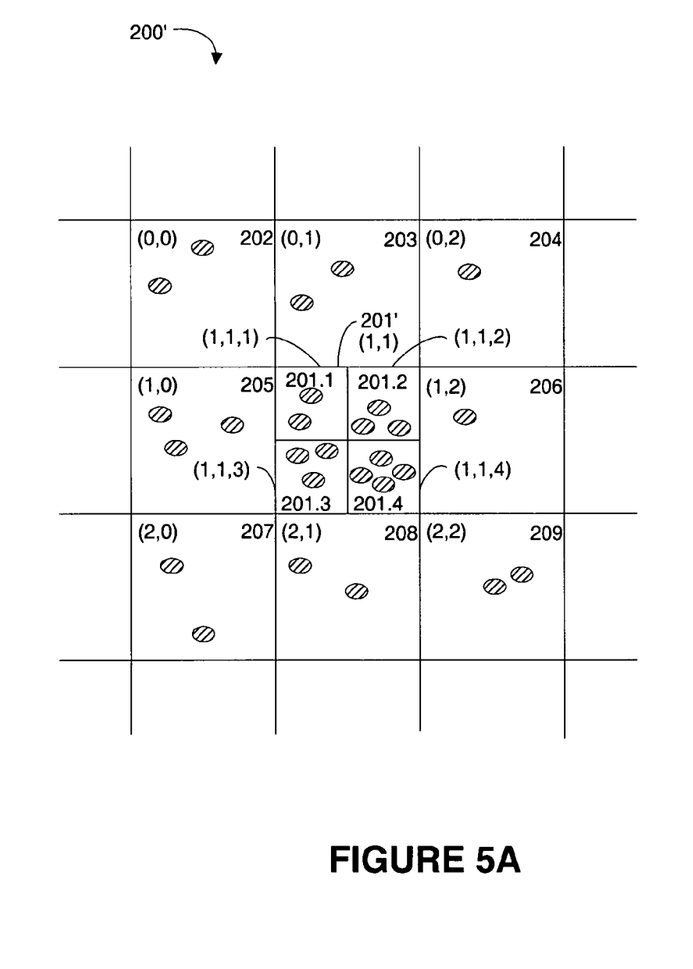
FIGS. 5A and 5B show partitioned FCGs, in accordance with two embodiments of the present invention.
Figure 5B:
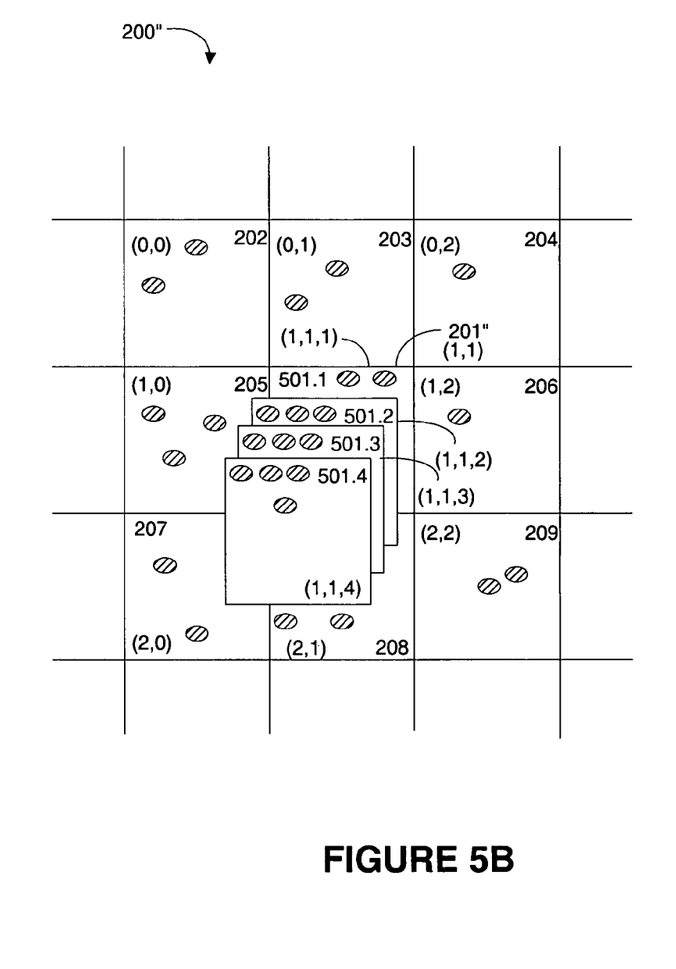

FIGS. 5A and 5B show partitioned FCGs 201' and 201", in accordance with two embodiments of the present invention. Referring first to FIG. 5A, a UG 200' includes multiple FCGs 201'-209. Each of the FCGs 201'-209 includes multiple peer members (represented by the hashed ellipses). In one embodiment, the FCG 201' has an exemplary location identifier of (1,1). FCG 201' has many more peers than the other FCGs 202-209. By way of example, if the preselected FCG limit of the number of member peers is 10, then, because FCG 201' encompasses 11 peers, FCG 201' can be partitioned into subdivided FCGs 201.1, 201.2, 201.3 and 201.4 by a partitioning means. In one embodiment, the FCG 201' can be partitioned into octrees by a first type of partitioning means. While FCG 201' is shown partitioned by the partitioning means into only four subdivided FCGs, it should be understood that FCG 201' can be partitioned into more or fewer than four subdivided FCGs.

Subdivided FCGs 201.1, 201.2, 201.3 and 201.4 have respective subdivided location identifiers of (1,1,1), (1,1,2), (1,1,3) and (1,1,4). The right-most digit in the subdivided location identifiers indicate the new FCGs 201.1, 201.2, 201.3 and 201.4 and the two left digits (i.e., "1,1") are the same as the location identifier of the common parent FCG 201' and therefore indicate the relationship to the common parent FCG 201'. It should be understood that the exemplary location identifier of (1,1) for FCG 201' is exemplary only. Other types of location identifier means could also be used.

The existence of the subdivided FCGs 201.1, 201.2, 201.3 and 201.4 is dependent on the number of connected peers. When a total number of peers connected in the subdivided FCGs falls below the preselected FCG limit, then the subdivided FCGs can collapse into fewer subdivided FCGs or even back the one parent FCG 201' by the partitioning means. Maintaining the location identifier relationship between the subdivided FCGs 201.1, 201.2, 201.3 and 201.4 and the parent FCG 201' allows the number of connections (i.e., load) to be easily and dynamically balanced (e.g., distributed across more or fewer subdivided FCGs) as the load increases and decreases.

Referring now to FIG. 5B, a UG 200" includes multiple FCGs 201"-209. Each of the FCGs has multiple peers. FCG 201" has a location identifier of (1,1). FCG 201" encompasses 11 peers, and therefore the FCG 201" can be partitioned into subdivided "stacked" FCGs 501.1, 501.2, 501.3 and 501.4 by a second partitioning means. The FCG 201" can be partitioned by stacking one or more stacked FCGs as the FCG 201" becomes loaded over the preselected limit. While FCG 201" is shown with four stacked FCGs, it should be understood that FCG 201" can be partitioned into more or fewer than four stacked FCGs.

Stacked FCGs 501.1, 501.2, 501.3 and 501.4 have respective location identifiers of (1,1,1), (1,1,2), (1,1,3) and (1,1,4) that show the relationship to the parent FCG 201". The number of stacked FCGs is dependent on the number of connected peers, and therefore when the number of peers connected in the stacked FCGs falls below the preselected FCG limit, the stacked FCGs can collapse into fewer stacked FCGs or even back the one parent FCG 201". Maintaining the location identifier relationship between the stacked FCGs 501.1, 501.2, 501.3 and 501.4 and the parent FCG 201" allows the load to be easily and dynamically balanced as the load increases and decreases.

In another embodiment, the FGCs can be initially formed in a relatively small number of peers. As a result there would be many more, although smaller FGCs than as described above. As the number of peers in each FGC falls, then the FGCs can be dynamically merged to form larger FGCs. By way of example, in an initial formation stage, the FGCs can be initiated with a relatively low number peers such as four peers. Several FGCs can be formed with four peers. Over time some of the peers will disconnect from some of the FGCs leaving those FGCs with fewer than four peers. If a first FGC has two peers and a second FGC has two peers, then the first and second FGCs can be merged to form a merged FGC. The merged FGC includes a merged location identifier that is related to the first FGC and the second FGC.

Figure 6:
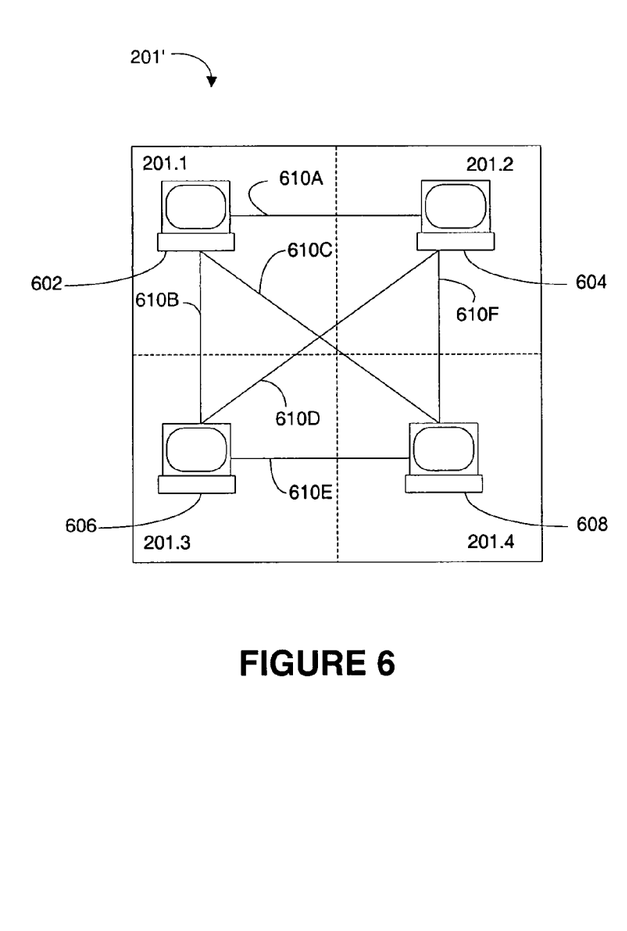
FIG. 6 shows a more detailed view of a partitioned FGC, in accordance with one embodiment of the present invention.

FIG. 6 shows a more detailed view of a partitioned FGC 201', in accordance with one embodiment of the present invention. The FGC 201' is partitioned into four subdivided FGCs 201.1-201.4. The subdivided FGCs 201.1-201.4 include peers 602-608, respectively. Each one of the peers 602-608 is directly connected to each other one of the peers 602-608 by links 610A-610F. As illustrated herein, peers 602-608 can represent one or more computing devices.

Figure 7:
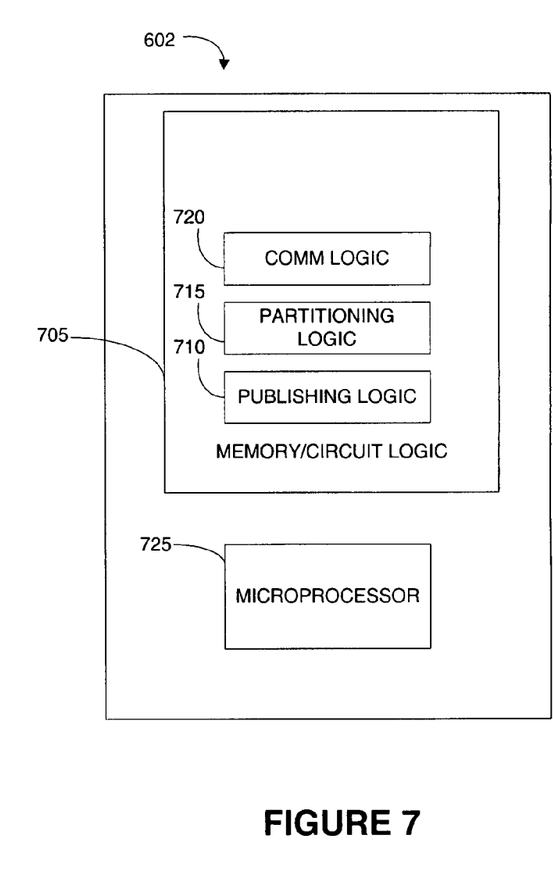
FIG. 7 is a block diagram of a peer computing device, in accordance with one embodiment of the present invention.

FIG. 7 is a block diagram of an exemplary peer computing device 602, in accordance with one embodiment of the present invention. The peer computing device 602 includes memory and/or circuit logic 705 and a microprocessor 725. The memory and/or circuit logic 705 includes logic for publishing 710, logic for partitioning 715 and logic for communicating 720. The logic for communicating 720 provides the communication means between the peer 602 and other peers (e.g., peers 604-608). The logic for communicating 720 can also monitor and determine the number of peers connected to an FGC. The logic for communicating 720 can use any of the many well known peer-to-peer communication methods to communicate with the other peers in the peer-to-peer environment.

The logic for partitioning 715 provides the partitioning means and can coordinate partitioning of an FGC when a maximum limit of peers that are linked to the FGC is exceeded. Conversely, the logic for partitioning 715 can also coordinate a collapse (i.e., combination) of two or more subdivided FGCs, when the maximum limit of peers that are linked to the subdivided FGCs is no longer exceeded. The logic for publishing 710 provides the publishing means for publishing a location identifier and the resources of the peer 602 on to the universal grid.

Each of the peers 604-608 in the peer-to-peer environment can include the microprocessor 725, logic for publishing 710, logic for partitioning 715 and logic for communicating 720. The logic for communicating 720 provides the communication means between the peers 602-608 and can also monitor and determine the number of peers connected to the FGC. The logic for partitioning 715 allows each of the peers 604-608 to coordinate the partitioning of the FGC.

It should also be understood that while the above-described partitioning means is used to partition a parent FGC into multiple subdivided (or stacked) FGCs, the described partitioning means could also be used to further partition each of the subdivided (or stacked) FGCs into yet further additional FGCs. Subsequent iterations of the partitioning means could further partition subsequent generations of FGCs. Each generation of subdivided or stacked FGCs maintains a relationship with the parent FGC. The relationship is maintained in the location identifying means of each of the additional FGCs.

While the embodiments described herein refer to a peer-to-peer environment, it should be understood that the peer-to-peer environment could be used for many purposes. By way of example, video game applications can use peer-to-peer environments to interconnect and interact between two or more video game applications and/or between two of more video game consoles. The peer-to-peer environment can provide the intercommunication that allows interactive video gaming applications that can be used (e.g., played) by two or more users. Accordingly, with respect to a video game application any suitable video game console, such as the "PLAYSTATION 2"® manufactured by Sony Computer Entertainment Inc. may be incorporated with the embodiments described herein. However, the embodiments including a video game console may also include any suitable computing device in place of the video game console.

It should be appreciated that the embodiments described herein may also apply to on-line gaming applications. That is, the embodiments described herein may occur in a peer-to-peer environment that sends a signal to multiple users (e.g., peers) over a distributed network (e.g., the Internet, LAN, WAN, wireless network, etc.) to enable players at remote locations to communicate and interact with each other. It should be further appreciated that the embodiments described herein may be implemented through either hardware or a software implementation. That is, the functional descriptions discussed above may be synthesized to define a microchip configured to perform the functional tasks for locating and tracking a user's head or facial region and translating the tracked movement to define a scene for presentation With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store or transport data that can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion. The computer readable medium can also include a data signal that can be received and transmitted such as over a data communication network.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of dynamically balancing a load on a fully connected grid (FCG) in a peer-to-peer environment, comprising:
   determining if a first number of peer computing devices connected in a first FCG is greater than a preselected limit, wherein at least one of the peer computing devices includes computer readable code for determining if the first number of peer computing devices connected in to the first FCG is greater than the preselected limit, wherein the first FCG provides direct links between each of the peer computing devices connected to the first FCG, and wherein each peer computing device in the first FCG receives and retains a notification of all the resources available in all of the peer computing devices in the first FCG wherein the notification includes a corresponding location identifier and corresponding resources provided by each of the peer computing devices in the first FCG; and
   partitioning the first FCG into two or more subdivided FCGs when the first number of peer computing devices connected to the first FCG is greater than the preselected limit, wherein each of the subdivided FCGs includes at least two peer computing devices that were previously connected in the first FCG and wherein each peer computing device in the two or more subdivided FCGs includes a subdivided location identifier relationship to a location identifier for the first FCG.

2. The method of claim 1, further comprising publishing a subdivided location identifier for each respective resource included in each peer connection.

3. The method of claim 2, wherein the subdivided location identifiers are related to a location identifier for the first FCG.

4. The method of claim 1, wherein partitioning the first FCG into the subdivided FCGs includes partitioning the first FCG into octrees.

5. The method of claim 1, wherein partitioning the first FCG into two or more new FCGs includes partitioning the first FCG into two or more stacked FCGs.

6. The method of claim 5, further comprising:
   determining if a total number of peer computing devices connected to the subdivided FCGs is less than the preselected limit;
   if the total number of peer computing devices connected to the subdivided FCGs is less than the preselected limit, then collapsing the subdivided FCGs into the first FCG; and
   publishing a location identifier for each respective resource included in each peer computing device connection to the first FCG.

7. The method of claim 1, wherein at least a portion of the peer-to-peer environment is connected to the Internet.

8. The method of claim 1, wherein at least a portion of the peer-to-peer environment enables an interactive gaining application.

9. The method of claim 1, wherein a game console includes at least one peer computing device.

10. A system for managing load in a peer-to-peer environment, comprising:
    a plurality of peer computing devices connected in a first fully connected grid (FCG) in the peer-to-peer environment, wherein the first FCG provides direct links between each of the plurality of peer computing devices connected to the first FCG, and wherein each peer computing device in the first FCG receives and retains a notification of all the resources available in all of the peer computing devices in the first FCG wherein the notification includes a corresponding location identifier and corresponding resources provided by each of the peer computing devices in the first FCG;
    logic for determining if a first number of peer computing devices connected to the first FCG is greater than a preselected limit is included in at least one of the plurality of peer computing devices; and
    logic for partitioning the first FCG into subdivided FCGs, if the first number of peer computing devices connected to the first FCG is greater than the preselected limit is included in at least one of the plurality of peer computing devices, wherein each of the subdivided FCGs includes at least two peer computing devices that were previously connected in the first FCG and wherein each peer computing device in the two or more subdivided FCGs includes a subdivided location identifier relationship to a location identifier for the first FCG.

11. The system of claim 10, wherein at least one of the plurality of peer computing devices includes the logic for determining if a first number of peer computing devices connected to the first FCG is greater than a preselected limit and the logic for partitioning the first FCG into subdivided FCGs, if the first number of peer computing devices connected to the first FCG is greater than the preselected limit.

12. The system of claim 10, further comprising logic for publishing a subdivided location identifier for each respective resource included in each peer computing device connection.

13. The system of claim 12, wherein the subdivided location identifiers are related to a location identifier for the first FCG.

14. The system of claim 10, wherein the logic for partitioning the first FCG into the subdivided FCGs includes logic for partitioning the first FCG into octrees.

15. The system of claim 10, wherein the logic for partitioning the first FCG into the subdivided FCGs includes logic for partitioning the first FCG into two or more stacked FCGs.

16. The system of claim 10, further comprising:
logic for determining if a total number of peer computing devices connected to the subdivided FCGs is less than a preselected limit;
logic for collapsing the subdivided FCGs into the first FCG, if the total number of peer computing devices connected to the subdivided FCGs is less than the preselected limit; and
logic for publishing a location identifier for each respective resource included in each peer computing device connection to the first FCG.

17. The system of claim 10, wherein at least a portion of the peer-to-peer environment enables an interactive gaining application.

18. The system of claim 10, further comprising a game console that includes at least one peer computing devices in the peer-to-peer environment.

19. A system, comprising:
a peer computing device, wherein the peer computing device is one of a plurality of peer computing devices connected to a first fully connected grid (FCG) in peer-to-peer environment, wherein the first FCG provides direct links between each of the plurality of peer computing devices connected to the first FCG, and wherein each peer computing device in the first FCG receives and retains a notification of all the resources available in all of the peer computing devices in the first FCG, wherein the notification includes a corresponding location identifier and corresponding resources provided by each of the peer computing devices in the first FCG, the peer computing device including:
logic for communicating with at least another one of the plurality of peer computing devices;
logic for determining if a first number of peer computing devices connected to the first FCG is greater than a preselected limit; and
logic for coordinating subdivision of the first FCG into two or more subdivided FCGs with at least two of the plurality of peer computing devices, if the first number of peer computing devices connected to the first FCG is greater than the preselected limit and wherein each peer computing device in the two or more subdivided FCGs includes a subdivided location identifier relationship to a location identifier for the first FCG.

20. The system of claim 19, wherein each of the subdivided FCGs includes at least one peer computing device connection that was previously connected to the first FCG.

21. The system of claim 19, further comprising logic for publishing a subdivided location identifier for each respective resource included in each peer computing device connection.

22. The system of claim 19, wherein the peer computing device is a game console.

23. The system of claim 19, further comprising:
logic for determining if a total number of peer computing devices connected to the subdivided FCGs is less than the preselected limit; and
logic for coordinating collapsing the subdivided FCGs into the first FCG, if the total number of peer computing devices connected to the subdivided FCGs is less than the preselected limit.

24. A system, comprising:
a first fully connected grid (FCG) in a peer-to-peer environment;
a plurality of peer computing devices connected to the first FCG, wherein the first FCG provides direct links between each of the plurality of peer computing devices connected to the first FCG, and wherein each peer computing device in the first FCG receives and retains a notification of all the resources available in all of the peer computing devices in the first FCG, wherein the notification includes a corresponding location identifier and corresponding resources provided by each of the peer computing devices in the first FCG;
a computer readable code segment embodied in a non-transitory computer readable medium for determining if a first number of peer computing devices connected to the first FCG is greater than a preselected limit is included in at least one of the plurality of peer computing devices; and
a computer readable code segment embodied in a non-transitory computer readable medium for partitioning the first FCG into two or more subdivided FCGs is included in at least one of the plurality of peer computing devices, if the first number of peer computing devices connected to the first FCG is greater than the preselected limit, wherein each of the subdivided FCGs includes at least two peer computing devices that were previously connected to the first FCG and wherein each peer computing device in the two or more subdivided FCGs includes a subdivided location identifier relationship to a location identifier for the first FCG.

25. The system of claim 24, wherein at least one of the plurality of peer computing devices includes the computer readable code segment embodied in a non-transitory computer readable medium for determining if a first number of peer computing devices connected to the first FCG is greater than a preselected limit and the computer readable code segment embodied in a non-transitory computer readable medium for partitioning the first FCG into two or more subdivided FCGs, if the first number of peer computing devices connected to the first FCG is greater than the preselected limit.

26. The system of claim 24, wherein the peer computing device is a game console.

27. The system of claim 26, further comprising a second game console that includes at least one peer computing device in the peer-to-peer environment.

28. The system of claim 24, further comprising:
   a computer readable code segment embodied in a non-transitory computer readable medium for determining if a total number of peer computing devices connected to the subdivided FCGs is less than the preselected limit; and
   a computer readable code segment embodied in a non-transitory computer readable medium for collapsing the subdivided FCGs into the first FCG, if the total number of peer computing devices connected to the subdivided FCGs is less than the preselected limit.

29. The system of claim 24, wherein the computer readable code segment embodied in a non-transitory computer readable medium for partitioning the first FCG into two or more subdivided FCGs includes a computer readable code segment for partitioning the first FCG into octrees.

30. The system of claim 24, wherein the computer readable code segment embodied in a non-transitory computer readable medium for partitioning the first FCG into two or more subdivided FCGs includes a computer readable code segment for partitioning the first FCG into two or more stacked FCGs.

31. The system of claim 24, wherein at least a portion of the peer-to-peer environment is connected to the Internet.

32. The system of claim 24, wherein at least a portion of the peer-to-peer environment enables an interactive gaining application.

33. The system of claim 24, wherein the non-transitory computer readable medium includes a propagated data signal.

34. A peer-to-peer network comprising:
   a universal grid;
   at least two subdivided fully connected grids (FCGs), each subdivided FCGs having a location identifier related to a parent location identifier for a parent FCG each of the subdivided FCGs having at least two peer computing devices that were previously connected in the parent FCG; and
   a plurality of peer computing devices, each one of the plurality of peer computing devices being a member of the universal grid, and at least a portion of the plurality of peer computing devices being members of at least one of the at least two subdivided FCGs, wherein each one of the two or more subdivided FCGs provides direct links between each of the portion of the plurality of peer computing devices being members of the respective at least two subdivided FCGs, and wherein each peer computing device in the at least two subdivided FCGs receives and retains a notification of all the resources available in all of the peer computing devices in the respective one of the at least two subdivided FCGs, wherein the notification includes a corresponding location identifier and corresponding resources provided by each of the peer computing devices in the parent FCG, and wherein each peer computing device in the two or more subdivided FCGs includes a subdivided location identifier relationship to a location identifier for the first FCG.

35. The peer-to-peer network of claim 34, wherein the at least two subdivided FCGs are octrees of the parent FCG.

36. The peer-to-peer network of claim 34, wherein the at least two subdivided FCGs are stacked FCGs.

37. The peer-to-peer network of claim 34, wherein the peer-to-peer network is connected to the Internet.

38. The peer-to-peer network of claim 34, wherein at least a portion of the peer-to-peer network supports an interactive gaining application.

39. The peer-to-peer network of claim 34, further comprising a game console that includes at least one peer computing device in the peer-to-peer environment.

40. A peer-to-peer network:
   a universal grid;
   at least two subdivided fully connected grids (FCGs), each subdivided FCGs having a location identifier means related to a parent location identifier means for a parent FCG;
   a plurality of peer computing devices, each one of the plurality of peer computing devices being a member of the universal grid, and at least a portion of the plurality of peer computing devices being members of at least one of the at least two subdivided FCGs, wherein each one of the at least two subdivided FCGs provides direct links between each of the portion of the plurality of peer computing devices being members of the respective at least two subdivided FCGs, and wherein each peer computing device in the at least two subdivided FCGs receives and retains a notification of all the resources available in all of the peer computing devices in the respective one of the at least two subdivided FCGs, wherein the notification includes a corresponding location identifier and corresponding resources provided by each of the peer computing devices in the first FCG;
   means for determining if a first number of peer computing devices connected to the parent FCG is greater than a preselected limit; and
   means for partitioning the parent FCG into the two or more subdivided FCGs, if the first number of peers connected to the parent FCG is greater than the preselected limit and wherein each peer computing device in the two or more subdivided FCGs includes a subdivided location identifier relationship to a location identifier for the first FCG each of the two or more subdivided FCGs having at least two peer computing devices that were previously connected in the parent FCG.

41. The peer-to-peer network of claim 40, wherein at least one of the plurality of peer computing devices includes the means for determining if the first number of peer computing devices connected to the parent FCG is greater than the preselected limit and the means for partitioning the parent FCG into the two or more subdivided FCGs, if the first number of peer computing devices connected to the parent FCG is greater than the preselected limit.

42. The peer-to-peer network of claim 40, further comprising means for publishing a subdivided location identifier for each respective resource included in each peer computing device connection.

43. The peer-to-peer network of claim 40, further comprising:
   means for determining if a total number of peer computing devices connected to the subdivided FCGs is less than a preselected limit; and
   means for collapsing the subdivided FCGs into the parent FCG, if the total number of peer computing devices connected to the subdivided FCGs is less than the preselected limit.

44. A non-transitory computer readable medium having a computer readable code segment for balancing a load on a fully connected grid (FCG) in a peer-to-peer environment, comprising:
   a computer readable code segment for determining if a first number of peer computing devices connected in a first FCG is greater than a preselected limit is included in at least one of a plurality of peer computing devices in the peer-to-peer environment, wherein the FCG provides direct links between each of the plurality of peer computing devices connected to the FCG, and wherein each peer computing device in the first FCG receives and retains a notification of all the resources available in all of the peer computing devices in the first FCG, wherein the notification includes a corresponding location identifier and corresponding resources provided by each of the peer computing devices in the first FCG; and a computer readable code segment for partitioning the first FCG into two or more subdivided FCGs, if the first number of peer computing devices connected to the first FCG is greater than the preselected limit, wherein each of the subdivided FCGs includes at least two peer computing devices that were previously connected in the first FCG is included in at least one of the plurality of peers in the peer-to-peer environment and wherein each peer computing device in the two or more subdivided FCGs includes a subdivided location identifier relationship to a location identifier for the first FCG.

45. The non-transitory computer readable medium of claim 44, wherein at least one of a plurality of peers in the peer-to-peer environment includes the computer readable code segment for determining if a first number of peer computing devices connected to the first FCG is greater than a preselected limit and the computer readable code segment for partitioning the first FCG into subdivided FCGs, if the first number of peer computing devices connected to the first FCG is greater than the preselected limit.

46. The non-transitory computer readable medium of claim 44, further comprising a computer readable code segment for publishing a subdivided location identifier for each respective resource included in each peer computing device connection.

47. The non-transitory computer readable medium of claim 44, wherein the subdivided location identifiers are related to a location identifier for the first FCG.

48. The non-transitory computer readable medium of claim 47, further comprising:

a computer readable code segment for determining if a total number of peer computing devices connected to the subdivided FCGs is less than the preselected limit; a computer readable code segment for collapsing the subdivided FCGs into the first FCG, if the total number of peer computing devices connected to the subdivided FCGs is less than the preselected limit; and a computer readable code segment for publishing a location identifier for each respective resource included in each peer computing device connection to the first FCG.

49. A method of dynamically balancing a load on a fully connected grid (FCG) in a peer-to-peer environment, comprising:

determining if a first number of peer computing devices connected in a first FCG is less than a preselected limit, wherein at least one of the peer computing devices includes computer readable code for determining if the first number of peer computing devices connected in to the first FCG is less than the preselected limit, wherein the first FCG provides direct links between each of the peer computing devices connected to the first FCG, and wherein each peer computing device in the first FCG receives and retains a notification of all the resources available in all of the peer computing devices in the first FCG, wherein the notification includes a corresponding location identifier and corresponding resources provided by each of the peer computing devices in the first FCG; and merging the first FCG with a second FGC to form a merged FGC when the first number of peer computing devices connected to the first FCG is less than the preselected limit, the merged FGC having a merged location identifier that is related to the first FCG and the second FGC and wherein each peer computing device in the merged FCGs includes a location identifier relationship to a corresponding location identifier for the respective first FCG or second FCG.

\* \* \* \* \*